United States Patent Office 2,732,947
Patented Jan. 31, 1956

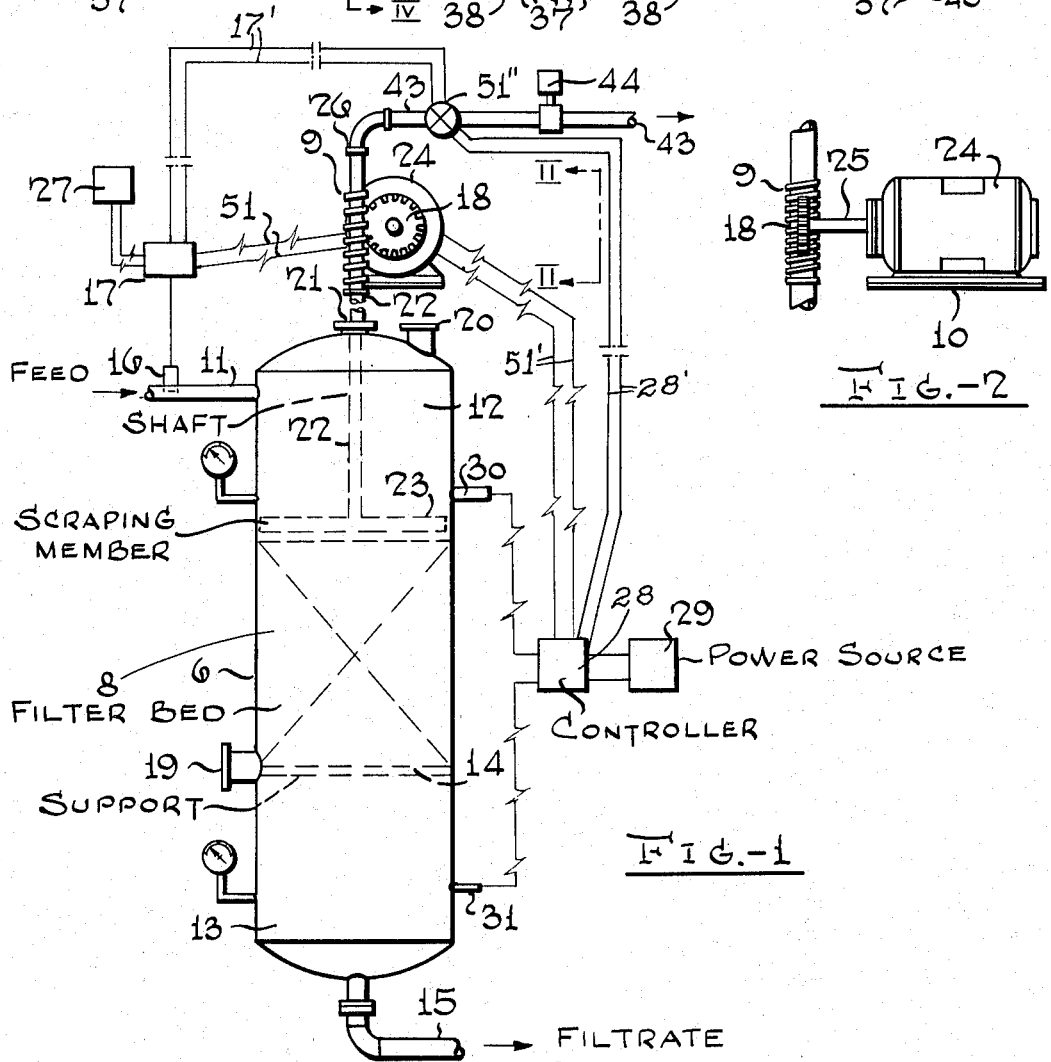
Jan. 31, 1956     H. W. WHITE     2,732,947
GRAVITY FILTER
Filed June 13, 1952
Howard W. White    Inventor
By W. O. J Heilman   Attorney

2,732,947

GRAVITY FILTER

Howard W. White, Roselle, N. J., assignor to Esso Research and Engineering Company, a corporation of Delaware Application June 13, 1952, Serial No. 293,319

8 Claims. (Cl. 210—142)

This invention concerns improvements in gravity filters. More particularly, it concerns improvements whereby such filters can now operate with greatly increased service factors, and whereby high filter rates can be maintained throughout a filtering operation. It relates especially to a gravity filter which contains means for periodically or continuously removing portions of the filter bed that have become occluded with solid materials. It particularly relates to a gravity filter that is provided with a hollow scraping member which serves to loosen plugged portions of the filter bed, in combination with means for withdrawing these portions from the filter through the hollow member.

Gravity-type filters are used extensively in many industries for removing sediment or precipitate from a liquid. They find particular use in the petroleum industry for filtering hydrocarbon fractions such as fuel oils, naphthas, wax, etc. where they generally operate at 50–100 p. s. i. g. inlet pressure and about 50 p. s. i. g. outlet pressure. It is with filters of this type that the present invention is especially concerned.

A gravity filter conventionally consists of a vessel such as a cylindrical tank having a porous or perforated false bottom covered by a filtering medium. Beds of fine sand, charcoal, clay, kieselguhr, etc. are among the materials that are used as filter media in gravity filters. The liquid to be filtered flows into the filter vessel or tank at a position above the filter bed. It then passes by gravity down through the bed and the false bottom into a lower section of the vessel at which point it is removed from the vessel. The filter bed acts to remove any sediment or solids from the liquid feed.

It is a characteristic of this type of filter that the upper portions of the bed are the first to become plugged with any solid materials that are separated from the liquid feed. Further, as the bed becomes more and more plugged with solids, the flow rate of liquid through the bed gradually decreases. To maintain a sustained high rate of flow, the pressure of the liquid feed is sometimes gradually increased as the filtering operation progresses. Whether or not pressure is employed for this purpose, however, upper portions of the filter bed eventually become so plugged that it becomes necessary to either remove the solid material from the bed, or, as is usually the case, to replace the entire bed with fresh material. To remove solid material from the bed, steam or other suitable fluids are often back-washed through the bed to carry away the occluded solid materials. But whether the bed is backwashed or actually replaced, operation of the filter is interrupted and generally speaking, the filter is out of service for a considerable period of time. Depending upon the type of material being filtered, shutdown of a gravity-type filter in petroleum refinery service can occur anywhere from once a week to once every 3 or 4 months. As a result, the service factor of such apparatus is not very great.

It is an object of the present invention to materially increase the service factor of a gravity filter by providing means for periodically or continuously removing those portions of the filter bed that have become occluded or plugged with solid materials. It is a further object of the present invention to maintain high rates of flow through such a filter without resorting to increased pressures on the liquid feed or back-washing of the filter bed. These objects and further objects will become apparent from the description which follows.

It is felt that the present invention can be best understood by reference to the attached figures in which:

Fig. 1 illustrates a gravity filter incorporating the novel features described in this invention;

Fig. 2 depicts a side view of apparatus suitable for driving a hollow scraping member within the gravity filter;

Fig. 3 shows in detail a view of a satisfactory scraping member;

Fig. 4 presents a fragmentary cross-section view of a blade portion of the scraping member; and Fig. 5 shows an end view of the blade.

In the drawings, wherein for the purpose of illustration is shown a preferred embodiment of the present invention, the numeral 6 designates a filter vessel or tank which is provided with an inlet conduit 11, an outlet conduit 15, an access hole 19, a charging connection 20, and a packing gland or shaft seal 21. The vessel is further provided with a porous or perforated filter bed support 14 which is disposed laterally within the vessel and preferably attached to the interior surface of the vessel. A filter bed 8 consisting of fine sand, charcoal, clay, kieselguhr, and the like, rests upon the filter bed support.

The filter vessel itself is divided into three main sections—an upper section 12 which is connected directly with the inlet conduit 11, a lower section 13 which is connected directly with the outlet conduit 15, and a filter bed section 8 which is positioned between the upper and lower sections. A hollow shaft 22 passes downwardly through the packing gland 21 into the upper section of the vessel, and has attached to its lower end a hollow scraping member 23 which is normally positioned just above the top surface of the filter bed. The scraping member is of a character such that it may be brought against the upper surface of the filter bed and through such contact to loosen and break up occluded portions of the bed into fine particles. The scraping member is further provided with passageways adapted to receive and transport the loosened particles to a point outside the gravity filter proper. An example of a satisfactory scraping member will be given later in this description.

An exterior portion 9 of the hollow shaft 22 is threaded to engage a gear 18 which is actuated by a driving mechanism 24 through shaft 25. The driving mechanism, supported on base 10, is preferably of the reversible type. It acts to cause the hollow shaft and hollow scraping member to revolve in a horizontal direction, as well as to give the shaft and scraping member a simultaneous vertical movement. At a point above the threaded section, the hollow shaft terminates in a hollow swivel joint 26 which permits the shaft to revolve without any corresponding movement of the joint. This joint is preferably an elbow, the other end of which connects with a flexible conduit 43. Thus, the swivel joint and flexible conduit are free to move vertically but do not rotate with the shaft.

The driving mechanism 24 may be actuated in several different ways. For example, a flow rate detector 16 can be positioned in line 11, signals from this detector being transmitted to a control instrument 17 which in turn actuates the driving mechanism 24 by supplying power from a power source 27 through lines 51. The detector is preferably of a type that generates an actuating signal to the control instrument when the flow rate in the inlet line falls below a predetermined level. The detecting, controlling, and driving systems may be any one of the types of apparatus that are conventionally employed for such a purpose. For example, electrical, hydraulic, or pneumatic systems may be employed along with suitable connecting circuits.

Alternatively, driving mechanism 24 may be actuated by a control instrument 28 which receives a signal from pressure detectors 30 and 31 positioned in the upper and lower sections respectively of the filter vessel. These detectors are preferably of a type that sends a signal to the control instrument 28 when a predetermined pressure drop occurs across the filter bed. Upon reception of this signal, the control instrument sends power from the power source 29 through lines 51' to the driving mechanism 24, which in turn serves to rotate the hollow shaft and also to contact the scraping member with the filter bed.

Again, this detection and control system can use any of the conventional forms of devices suitable for this purpose.

Referring to Fig. 3, which illustrates a preferred form of a scraping member, it will be noted that the hollow portion 32 of the shaft 22 connects directly with hollow portions 33 of the scraping member 23. The scraping member preferably comprises a cylindrical central section 34 which is connected to one or more hollow scraper blades 35. The blades extend laterally from the shaft and are of such a length as to just clear the inner walls of the filter vessel. The ends 36 of the hollow blades are blanked off and a plurality of prongs or teeth 37 are attached to the bottom surface of the blades and the cylindrical section. The teeth, which are preferably ½ to 3 inches long, serve to loosen the surface portions of a filter bed when the scraping member is driven into and across the top of the bed. When the scraping member is equipped with more than one scraper blade, it is preferable to have the teeth on each blade staggered so that the teeth on the various blades loosen separate areas of the filter bed.

The scraper blades 35 as well as the central cylindrical portion 34 are provided with a plurality of passageways 38, which are preferably located just above and forward of the teeth. It is therefore possible for liquid and suspended solids to flow from a position within the filter vessel through the passageways 38 and hollow portions 33 of the scraping member into the hollow section 32 of the shaft and thence through the swivel member 26 and the flexible conduit 43 to a position outside the gravity filter proper. Each scraper blade is provided with a leading edge 40 and a trailing edge 41. The leading edge of a blade is defined as that portion of the blade to which are affixed the teeth and the plurality of passageways. The leading edge is preferably a substantially vertical member, while the trailing edge preferably has a curved surface. It is particularly contemplated that the trailing edge be cylindrical in shape and have a radius of curvature of from 1 to 10 inches.

The operation of the gravity filter is as follows: Liquid feed containing solid materials flows through conduit 11 into vessel section 12, through filter bed 8 and support 14 into vessel section 13 from whence it passes out through conduit 15. The solid materials are separated from the liquid by the filter bed and deposit primarily in the uppermost portions of the bed. When the liquid feed is being supplied at a constant pressure, the flow rate of the liquid will drop off in time as the upper portions of the bed gradually become plugged by the solid materials. Whenever the flow rate drops to a predetermined extent, flow rate detector 16 transmits a signal to control instrument 17, which in turn causes power to flow from power unit 27 to the driving unit 24. The driving unit actuates shaft 25 which in turn actuates gear 18 which is engaged with the threaded section 9 of hollow shaft 22. As a result the hollow shaft and the scraping member 23 turn in a horizontal plane and are driven vertically down toward the filter bed. Liquid within the filter vessel is prevented from escaping through the shaft opening in the vessel and the shaft by the shaft seal or packing gland 21.

A valve 51" is preferably positioned in conduit 43 which is in the open position when the scraping member is in operation and in the closed position when the scraping member is not in operation. This valve may be automatically opened and closed as for example by suitable circuits 17' or 28' connecting it with the control instruments 17 or 28 as the case may be. The valve, of course, may be automatically operated in any conventional manner.

As the hollow scraping member 23 is driven downward toward the bed, the teeth along the bottom edge of the scraping member engage and loosen the portions of the filter bed with which they come in contact. Inasmuch as the scraping member rotates horizontally in addition to moving vertically, the teeth serve to loosen the entire cross-sectional area of the bed. The vertical travel of the scraping member and shaft per revolution may be as much as 1 inch but is preferably less than ½ inch. The scraping member is preferably rotated at about ½ R. P. M. In most instances, no more than about two complete revolutions of the scraping member should be required to renew the surface of the filter bed. Thus, it is possible to reduce the time required for restoring normal conditions in a plugged gravity filter from the 2 to 24 hours required by backwashing, steaming, etc., to a period of 2 to 4 minutes by the present method.

Providing the pressure within the upper section of the filter vessel is sufficient to overcome the static head in the hollow shaft and overhead lines, loosened portions of the filter bed are caused to be carried along with a portion of the liquid feed through the passageways 38 into the hollow portions 33 of the scraping member. The liquid and solid materials then flow upwardly through the hollow portion 32 of shaft 22 and thence through the hollow swivel joint 26, valve 51", and the flexible conduit 43 to any desired location outside the gravity filter proper.

When the pressure within the upper section of the filter vessel is insufficient, i. e. less than about 5 p. s. i. g., to cause a flow of this character, a suitable pump 44 may be placed in line 43 to withdraw the liquid and solid materials. This pump may also, of course, be automatically actuated in any suitable manner. When a sufficient amount of the plugged portions of the filter bed has been removed and the liquid feed flow rate has increased to a predetermined value, the detector 16 ceases to transmit a sufficient signal to the control instrument 17, which in turn therefore stops the driving mechanism 24 and closes valve 51". Thus, it may be seen that a high filter rate through the filter bed can be maintained without resorting to the undesirable procedures of back-washing or replacing the entire filter bed.

Driving mechanism 24 is preferably of a reversible type, thus permitting the operator of the filter to locate the scraping member at any position above the filter bed within the filter vessel. This feature permits the operator to withdraw the scraping member to a position well above the bed and allows him to replenish the bed with fresh sand, charcoal, clay, etc., through the charging connection 20. The filter vessel is further provided with a manhole 19, which permits the operator to withdraw the entire filter bed from the filter vessel whenever such an operation is desired.

Feedstocks that can be satisfactorily filtered in the apparatus described include crude oils, reduced crudes, fuel oils, gas oils, waxes, naphthas and the like.

The filter may be employed at pressures up to 1000 p. s. i. g. and temperatures up to 850° F. It may be heated in any conventional manner including the use of steam and electricity.

The materials used in constructing the filter will depend on the operating conditions and on the nature of the stocks to be filtered. For example, the vessel itself may range from a 25 p. s. i. g. SWP carbon steel drum to a 1000 p. s. i. g. SWT alloy steel drum.

It is to be understood that the form of the present invention herewith shown and described, is to be taken as a preferred example of the same, and that various changes in the shape, size, and arrangement of the parts may be resorted to without departing from the spirit of the invention, or the scope of the subjoined claims.

What is claimed is:

1. In a gravity filter including a filter vessel, a stationary cylindrical filter bed of finely divided solid material, the improvement which comprises in combination a flow rate detector adapted to determine the occurrence of a plugging condition within the filter bed, an inlet conduit leading into said vessel above said filter bed, an outlet conduit leading from said vessel at a region below said filter bed, a scraping member movably disposed within said vessel, a shaft attached to said scraping member and piercing said vessel, sealing means for maintaining said shaft and said vessel in a fluid-tight movable relationship, a driving mechanism, controller means responsive to said flow rate detector, means actuated by said controller means for actuating said driving mechanism, said driving mechanism being connected with said shaft so as to impart a longitudinal and rotational movement to said shaft whereby said scraping member engages and breaks up plugged portions of said filter bed into fine particles and causes said particles to be suspended in the liquid within said filter vessel and means for withdrawing the resulting liquid suspension from said filter vessel.

2. In a gravity filter including a filter vessel, a filter bed of finely divided solid material, liquid inlet and outlet connections and means for supplying liquid under pressure to the filter vessel, the improvement which comprises in combination a hollow scraping member movably disposed within said vessel and above the filter bed, said member being of a character to break up the filter bed into fine particles when moved across the top surface of the bed, said member being provided with openings affording liquid access between hollow portions of said member and the interior of said vessel, a hollow shaft attached to said scraping member and piercing said vessel, sealing means maintaining said shaft and said vessel in fluid-tight relationship, a flow rate detector adapted to determine the occurrence of a plugging condition within the filter bed, a driving mechanism, controller means responsive to said flow rate detector, means actuated by said controller means for actuating said driving mechanism, said driving mechanism being connected with said shaft in such a way that the shaft moves rotationally and longitudinally whereby said scraping member contacts and breaks up the top surface of said filter bed into small particles, a hollow swivel joint connecting with the end of the shaft located outside of the filter vessel, a flexible conduit connecting with said swivel joint whereby a continuous passageway exists from within said vessel through the hollow scraping member, the hollow shaft, the swivel joint and the flexible conduit, a valve positioned within said conduit, said valve being open when the scraping member is being moved and shut when said member is stationary and means for generating a pressure differential between the interior of said vessel and said conduit whereby liquid and said small particles of filter bed are caused to flow through said passageway to a point outside of said filter vessel.

3. Apparatus as defined in claim 2 in which the hollow scraping member is provided with a plurality of teeth adapted to break up the filter bed into small particles when the scraping member contacts the filter bed.

4. Apparatus as defined in claim 3 in which the teeth are ½ to 3 inches long.

5. Apparatus as defined in claim 2 in which the pressure differential is generated by a pump positioned in the flexible conduit.

6. Apparatus as defined in claim 5 in which the pressure differential is at least 5 p. s. i.

7. Apparatus as defined in claim 2 in which the scraping member rotates at a speed of about ½ R. P. M. and moves longitudinally up to about 1 inch per revolution.

8. In a gravity filter including a filter vessel, a filter bed of finely divided solid material, liquid inlet and outlet connections and means for supplying liquid under pressure to said filter vessel, the improvement which includes, in combination, a hollow scraping member movably disposed within said vessel and above said filter bed, said scraping member being adapted to break up said filter bed into fine particles when moved across the top surface of said bed, said scraping member being provided with openings affording liquid access between hollow portions of said scraping member and the interior of said vessel, a hollow shaft attached to said scraping member and extending into said vessel, sealing means maintaining said shaft and said vessel in fluid tight relationship, detector means adapted to determine the occurrence of a plugging condition within said filter bed, a driving mechanism, controller means responsive to said means for detecting plugging within said filter bed, means actuated by said controller means for actuating said driving mechanism, said driving mechanism being connected with said shaft and adapted to move said shaft rotationally and longitudinally whereby said scraping member contacts and breaks up the top surface of said filter bed into small particles, a hollow swivel joint connecting with the end of the shaft located outside of said filter vessel, a flexible conduit connecting with said swivel joint whereby a continuous passageway exists from within said vessel through the hollow scraping member, the hollow shaft, the swivel joint and the flexible conduit, a valve positioned within said conduit, said valve being open when the scraping member is being moved and shut when said member is stationary and means for generating a pressure differential between the interior of said vessel and said conduit whereby liquid and said small particles of filter bed are caused to flow through said passageway to a point outside of said filter vessel.

References Cited in the file of this patent

UNITED STATES PATENTS

| | | |
|---|---|---|
| 232,735 | Loomis | Sept. 28, 1880 |
| 329,064 | Moore | Oct. 27, 1885 |
| 332,979 | Warren | Dec. 22, 1885 |
| 873,010 | Blaisdell | Dec. 10, 1907 |
| 981,031 | Stitzel | Jan. 10, 1911 |
| 1,045,830 | Gates | Dec. 3, 1912 |
| 1,702,193 | Blomfield et al. | Feb. 12, 1929 |
| 2,366,903 | Harms et al. | Jan. 9, 1945 |
| 2,451,073 | Cowherd | Oct. 12, 1948 |

FOREIGN PATENTS

| | | |
|---|---|---|
| 181,044 | Great Britain | June 6, 1922 |